(12) United States Patent
Gmeiner

(10) Patent No.: US 7,292,910 B2
(45) Date of Patent: Nov. 6, 2007

(54) METHOD AND DEVICE FOR MACHINING A WORKPIECE

(75) Inventor: Peter Gmeiner, Möttingen (DE)

(73) Assignee: KUKA Roboter GmbH (DE)

( * ) Notice: Subject to any disclaimer, the term of this patent is extended or adjusted under 35 U.S.C. 154(b) by 762 days.

(21) Appl. No.: 10/723,695

(22) Filed: Nov. 24, 2003

(65) Prior Publication Data

US 2004/0111185 A1    Jun. 10, 2004

(30) Foreign Application Priority Data

Nov. 26, 2002    (DE) ................................ 102 55 037

(51) Int. Cl.
*G06F 19/00* (2006.01)
(52) U.S. Cl. .................. 700/245; 700/193; 700/250; 700/253; 318/568.13; 318/568.18; 318/568.23; 318/568.24; 318/570; 701/23; 701/25; 901/3
(58) Field of Classification Search ................ 700/245, 700/193, 250, 253; 318/568.13, 570–573, 318/568.18, 568.23, 568.24; 701/23, 25; 901/3; 219/124.1; 414/730
See application file for complete search history.

(56) References Cited

U.S. PATENT DOCUMENTS

| | | | |
|---|---|---|---|
| 4,694,139 A | | 9/1987 | Röder |
| 4,891,765 A | | 1/1990 | Hatori et al. |
| 4,967,127 A | | 10/1990 | Ishiguro et al. |
| 5,006,999 A | * | 4/1991 | Kuno et al. .................. 700/253 |
| 5,723,962 A | | 3/1998 | Mizukami et al. |
| 5,737,500 A | | 4/1998 | Seraji et al. |
| 6,070,109 A | * | 5/2000 | McGee et al. ............... 700/259 |
| 6,163,124 A | * | 12/2000 | Ito et al. ...................... 318/567 |
| 6,356,806 B1 | | 3/2002 | Grob et al. |
| 7,130,718 B2 | * | 10/2006 | Gunnarsson et al. ........ 700/254 |

FOREIGN PATENT DOCUMENTS

| | | |
|---|---|---|
| DE | 689 18 318 T2 | 9/1994 |
| DE | 689 20 212 T2 | 12/1994 |

(Continued)

OTHER PUBLICATIONS

Paul, Richard P.: Robot Manipulators: Mathematics; Programming and Control; The Computer Control of Robot Manipulators, 1981, The MIT Press, pp. 52-53 and 122-123.

*Primary Examiner*—Thomas Black
*Assistant Examiner*—McDieunel Marc
(74) *Attorney, Agent, or Firm*—McGlew & Tuttle, P.C.

(57) ABSTRACT

A method for machining workpieces by means of a multi-axial manipulator, such as an industrial robot, with a tool moved proportionally by a control unit of the manipulator and which can perform characteristic movements with several degrees of freedom is characterized in that the degrees of freedom of the tool are evaluated together with the degrees of freedom of axes of the manipulator in real time for moving a tool tip (TCP) in accordance with a predetermined, continuous machining path or a portionwise continuous machining geometry (step function) and for determining a movement of the manipulator. The invention also proposes a device suitable for performing the aforementioned method, in which the tool and a tool tip, during workpiece machining, are movement-controllable by the manipulator control unit. In this way it is possible to drastically reduce the overall machining time.

19 Claims, 6 Drawing Sheets

FOREIGN PATENT DOCUMENTS

| | | |
|---|---|---|
| DE | 195 07 561 A1 | 9/1995 |
| DE | 196 14 232 A1 | 10/1996 |
| DE | 196 48 430 A1 | 5/1998 |
| DE | 196 26 459 C2 | 9/1999 |
| DE | 198 57 436 A1 | 6/2000 |
| EP | 0 336 342 | 10/1989 |
| EP | 0 349 291 | 1/1990 |
| EP | 0 671 246 A | 9/1995 |
| EP | 0 941 815 A | 9/1999 |
| EP | 1 038 649 A | 9/2000 |

* cited by examiner

METHOD AND DEVICE FOR MACHINING A WORKPIECE

FIELD OF THE INVENTION

The invention relates to a method for machining workpieces by means of a multiaxial manipulator, such as a robot, with a tool moved proportionally by a control unit of the manipulator and which can perform characteristic movements with several degrees of freedom. The invention also relates to a device for machining workpieces suitable for implementing the aforementioned method comprising a multiaxial manipulator with a control unit for movement control and a tool, which has a plurality of degrees of freedom for performing characteristic movements.

BACKGROUND OF THE INVENTION

When using manipulators, such as industrial robots, for machining workpieces, it is also possible to use tools which are able to perform characteristic movements with a number of degrees of freedom in principle independently of a movement of the manipulator. This e.g. applies to industrial robots, which carry at the distal end of the robot arm a laser and controllable focussing optics for the laser machining of workpieces. In this case, the aforementioned tool can e.g. be a laser cutting tool, a laser welding tool or a laser stamping tool, which is equipped with mobile mirror arrangements so as in this way to permit an active working movement of the laser beam, which is equivalent to the aforementioned characteristic movement of the tool.

The mobile mirror arrangements of such laser cutting tools are also known as scanner units or galvano units.

It is known in connection with methods or devices of the aforementioned types to use manipulators for the rough positioning of the tool in the vicinity of a workpiece to be machined and subsequently the tool (in the indicated example the mirror and as a result the laser beam) can follow or track small scale contours of a predetermined machining path. For machining larger scale contours the machining process must be interrupted and the manipulator repositioned. Subsequently the tool located on the manipulator again takes over the small scale machining of the workpiece. Such a procedure involves a time-consuming stop and go process, in which periodically the manipulator is stopped and periodically the tool is stopped. This also leads to unnecessarily large reorientations of the (relatively) slow manipulator.

The known methods and devices for machining workpieces also have further disadvantages. Thus, as a rule it is not possible to achieve a constant machining speed on random machining geometries, because movements of the manipulator, as a result of its greater weight and inertia, always take place with a lower speed than the small scale movements of the tool, particularly in the case of curves and bends in the contours. However, in laser methods a constant machining speed is a basic prerequisite for high quality machining.

Due to the fact that the prior art manipulator and tool are guided independently of one another from the control standpoint, the teaching process preceding machining is not easy to handle and is therefore susceptible to faults and errors, because for this purpose it is necessary to reprogram two controls. In addition, such known methods and devices cannot be given online or real time characteristics, because no paths can be modified at random without the in each case other control also having to be reprogrammed. For the same reason offline programming is only possible to a limited extent.

Other known methods and devices are restricted to the phasewise taking into account of a uniform linear movement of the manipulator, e.g. a conveyor belt or portal welder and are superimposed on the characteristic movements of the tool. Such methods and devices reach their limits when machining complex, randomly shaped surfaces and contours.

Whilst avoiding the aforementioned disadvantages, the problem of the invention is to improve a method and a device of the aforementioned type with regards to an optimum movement of the manipulator and the tool when machining randomly shaped workpieces and the further development of a device of the aforementioned type to be brought about is also to be characterized by real time adaptability and simplified handling, particularly when setting up machining processes.

SUMMARY OF THE INVENTION

In the case of a method of the aforementioned type, this problem is solved in that the degrees of freedom of the tool are evaluated together with the degrees of freedom of axes of the manipulator in real time for moving a tool tip (TCP) in accordance with a predetermined machining geometry and for the determination of a movement of the manipulator.

According to the invention, the aforementioned machining geometry can be a simple, continuous geometry, i.e. a machining path. However, a machining on an only portionwise continuous geometry, i.e. having a so-called step function or on a mixed form of the two geometries is also possible.

Thus, according to the invention, particularly in the case of a laser machining of workpieces with the aid of a scanner, the given, much faster positionability of the laser beam compared with conventional laser welding methods can be used in such a way that shorter, component-optimized movement paths of the manipulator are possible. In this connection results in particular an enormous speed advantage on avoiding a reorientation of axes of the manipulator. As a result of the real time integration of the tool movement different movement paths of the manipulator lead to identical machining paths on the workpiece, so that compared with the prior art the inventive method is characterized by a much higher flexibility in use. In addition, the combined evaluation of movements of the manipulator and the tool lead to simplified teaching and operating processes. Preferably evaluation takes place by the manipulator control unit.

In the case of a device of the aforementioned type the problem is solved in that the tool and a tool tip (TCP), during the machining of the workpiece, are movement-controllable by the control unit of the manipulator. Thus, it is possible to take account of the tool position at the time of path planning for the manipulator, so that the device according to the invention can be programmed offline.

According to a further development of the method according to the invention, for a movement control of the tool tip at least coordinates of a predetermined machining geometry must be read into a control unit of the manipulator, e.g. by a so-called teach-in. Such a machining geometry can be simply performed offline by means of a teaching device.

According to a preferred development of the method according to the invention, subsequently the machining geometry is discretized to a sequence of discreet coordinate values with an identical time interval (cycle time) between successive values. The cycle time, the so-called IPO cycle (interpolation cycle), is freely selectable in a wide range as a function of the electronic components used in the control unit, e.g. between 100 µs and 12 ms.

Preferably the coordinate values of the machining geometry are stored, prior to machining, in a memory unit associated with the control unit. Thus, preferably the coordinate values of the machining geometry are in each case entered in a data bank at the times determined by the IPO cycle. Thus, the data bank contains e.g. the time information of the IPO cycle as well as a desired position value allocated in each cycle time for the predetermined machining geometry in appropriate coordinates, e.g. Cartesian coordinates. The values stored in the memory unit can be polled or interrogated for the movement control of the manipulator and/or the tool by interpolation.

According to a particularly preferred development of the inventive method, with the coordinates of the machining geometry are associated deviation values in the form of correction values, which correspond to maximum amplitudes of the characteristic movements of the tool with respect to its degrees of freedom. In this way a type of "mobility tube" is defined around the machining geometry and corresponds to the area on the workpiece, which, on the basis of an assumed position on the machining geometry and as a result of a characteristic movement of the tool, can be reached and machined by the latter. In the inventive method preferably a movement path of the manipulator is determined by the control unit in that an instantaneous coordinate difference between the machining geometry and a position of the tool tip is no larger than the maximum amplitude of the corresponding characteristic movement of the tool. Thus, the actual movement path of the manipulator can be chosen in such a way that it is to a greater or lesser extent of a random nature within the above-defined mobility tube, so that the movement path can be as short as possible and correct for the component. Prior to machining, the movement path can be stored as a predetermined movement path of the manipulator in the memory unit associated with the control unit. However, according to the invention, such a predetermined movement path is not fixed and instead during machining can be modified so as to match the characteristic movements of the tool in real time.

According to a further development of the method according to the invention, individual coordinates of the movement path of the manipulator and as a function thereof a position and orientation (pose) of the tool at the cycles of the coordinate values of the machining geometry are determined. Thus, through the difference of the stored coordinate values of the machining path predetermined in the IPO cycle and the movement path of the manipulator determined in the same IPO cycle, the corresponding desired movement values for the degrees of freedom of the tool are obtained, e.g. for the mirror movements of a scanner system. According to the invention, they are transferred in real time to the scanner system.

According to the method of the invention the movements of the manipulator and the tool can be determined between the cycles by interpolation. The coordinate values determined in the IPO cycle can be adapted with the aid of suitably set up calculating means with respect to their determination frequency to the given configuration of the movement path or the machining geometry. Preferably, according to the inventive method, the cycle time is at least periodically adapted to at least one parameter of the movements. Said parameters can e.g. be a path curvature in space, so that during a linear movement less coordinate values are determined, because there can be a path planning by extrapolation.

According to a highly preferred development of the inventive method, the movement of the tool tip takes place with a largely constant speed, so that it is possible to ensure a decisive prerequisite for the use of the inventive method in a high quality workpiece machining operation, e.g. by laser action.

The device according to the invention is characterized in that either the workpiece or the tool, during machining, is connected to and movable by the manipulator. Thus, when using the device according to the invention, it is possible for a workpiece to be machined to be taken up by a suitably constructed manipulator, such as a six-axial industrial robot and to supply it to a separately positioned and fixed tool for machining and which is only control-connected to the manipulator (external TCP technology). However, it can be more economical from the method standpoint to directly fit the tool to the manipulator and move it together with the latter over the workpiece.

According to a preferred development of the device according to the invention, the latter has a memory unit associated with the control unit of the manipulator for storing at least a discretized sequence of coordinate values for a machining geometry on the workpiece, e.g. a volatile working memory or a permanent memory. For the further processing of such an offline-predeterminable coordinate sequence, the inventive device preferably has a determination unit for determining deviations for the coordinate values of the machining geometry corresponding to amplitudes of the characteristic movements of the tool.

The device according to the invention preferably also has determination means for the dynamic determination of a relative pose between the tool tip and a sum of the coordinate values of the machining geometry and the associated deviations.

According to the invention, the movement of the tool tip takes place within the space area (mobility tube) determined by the sum of the coordinate values of the machining geometry and the associated deviations. In this connection the inventive device has, according to a highly preferred further development, processor means which are programmed and set up for time and/or space optimization of an instantaneous movement of the manipulator using the degrees of freedom of the tool, because as a rule the tool movements can be performed more rapidly as a result of the lower weight or lower necessary movement amplitudes than corresponding, equivalent movements of the manipulator. It is consequently no longer necessary to move the manipulator at all times essentially on the requisite machining geometry. Instead the machining device can be in advance or trail behind the machining geometry, so that the manipulator positioning times can be greatly reduced, which has a positive effect on the overall machining time.

In addition, the leading or trailing of the tool, e.g. the galvano mirror, particularly in machining geometry curves gives rise to significant advantages, because in this way it is also possible to traverse narrow or confined movement radii without speed breaks.

BRIEF DESCRIPTION OF THE DRAWINGS

Further features and advantages can be gathered from the following description of embodiments of the invention given in exemplified form relative to the attached drawings, wherein show.

DETAILED DESCRIPTION OF THE DRAWINGS

Figure 1:
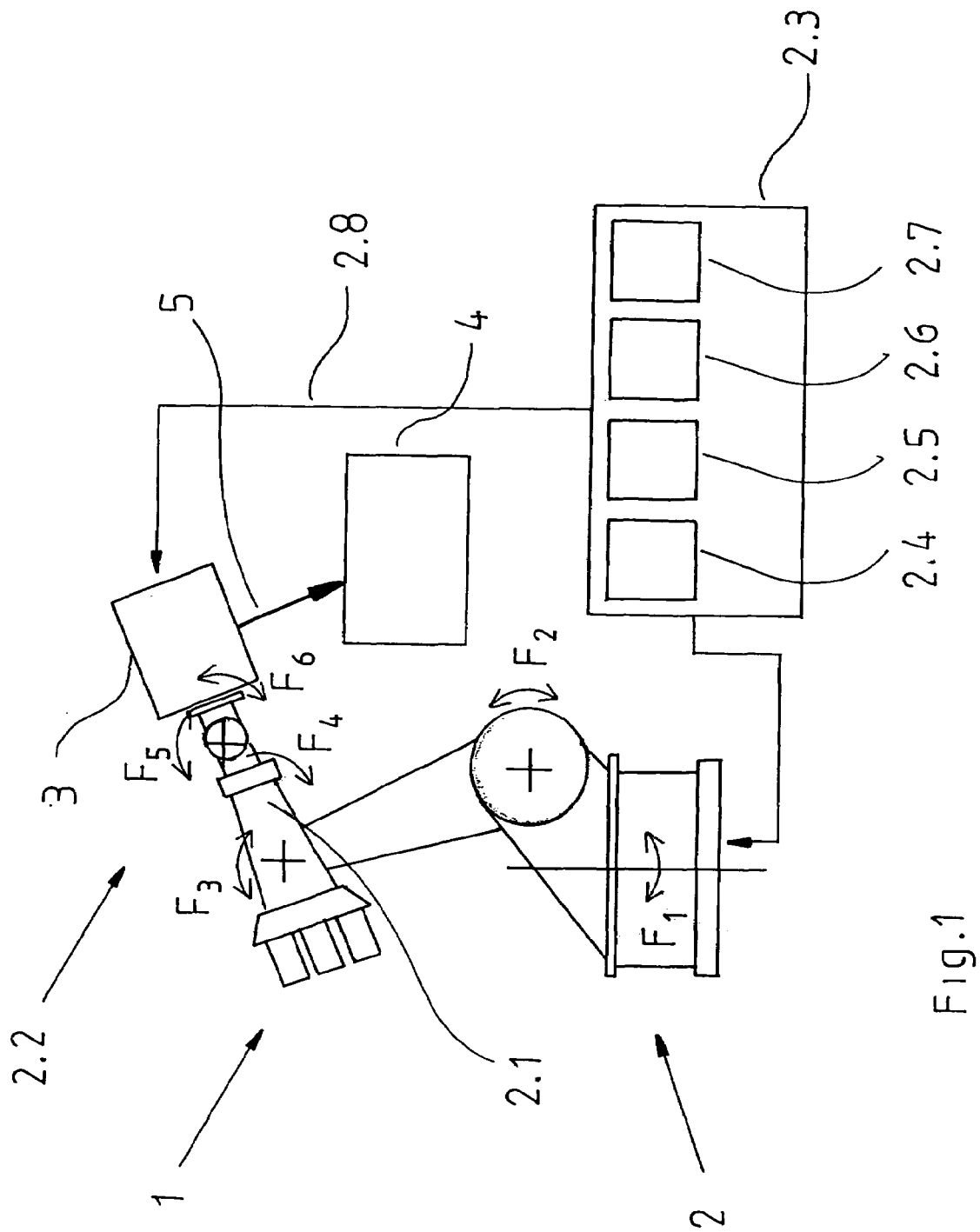
FIG. 1 An embodiment of the inventive device in the form of a six-axial industrial robot with a laser machining tool located at the distal end of the robot arm.

FIG. 1 shows a device 1 according to the invention with a manipulator 2 in the form of a six-axial industrial robot, which on the distal end 2.2 of its arm 2.1 is provided with a tool 3 for machining a workpiece 4. The robot 2 is constructed for movements in space with up to six degrees of freedom $F_1$ to $F_6$.

In the embodiment according to FIG. 1, the tool 3 is a laser machining tool with an integrated scanner system to be described in greater detail hereinafter relative to FIG. 2. As is diagrammatically shown in FIG. 1, the workpiece 4 is machined by a laser beam 5, which is emitted by the tool 3 or is part of said tool and acts on the workpiece 4.

For movement control purposes the device 1 according to the invention has a control unit 2.3, whose control signals are transmitted by means of a transmission medium 2.8, such as a field bus, real time ethernet or firewire to the tool 3 and/or the robot 2.

The control unit 2.3 incorporates further functional units, namely a memory unit 2.4, e.g. a working or permanent memory, a determination unit 2.5, further determination means 2.6 and processor means 2.7, which will be described in greater detail hereinafter relative to FIG. 3.

In the case of known devices of this type it is conventional practice to at least roughly position the tool 3 in the vicinity of the surface of the workpiece 4 to be machined by moving the robot 2 and subsequently the residual movements still necessary for machining the workpiece 4 are performed by characteristic movements of the tool 3 and corresponding movements of the laser beam 5. A movement control of the robot 2 and the tool 3 takes place substantially independently of one another and leads to most of the disadvantages mentioned hereinbefore.

Figure 2:
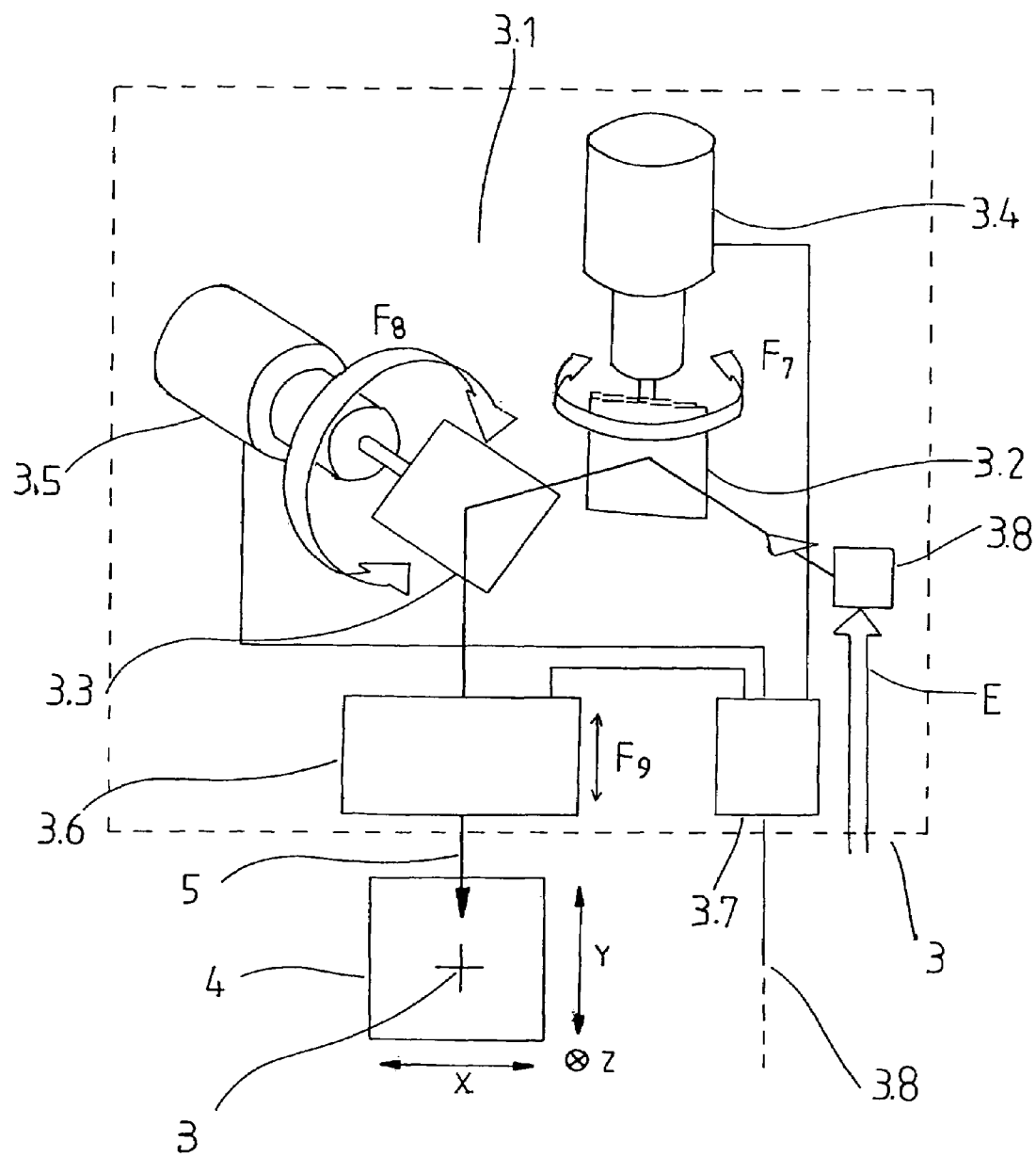
FIG. 2 A diagrammatic representation of the deflection of a laser beam used for work piece machining through the scanner system optics.

FIG. 2 diagrammatically shows the internal structure of the tool 3 of FIG. 1. For diverting the laser beam 5 it is equipped with a scanner system 3.1 comprising mirrors 3.2, 3.3 and associated drives 3.4, 3.5. The mirrors are followed in the optical path by a focussing optics 3.6. The tool 3 also comprises a control unit 3.7, which receives by means of the transmission medium 2.8 signals from the control unit 2.3 (FIG. 1) for controlling the drives 3.4, 3.5 and for the real time adjustment of optics 3.6.

With the aid of the rotary mirrors 3.2, 3.3 and the focussing optics 3.6, quasi-random machining geometries B in space can be followed in a specific area predetermined by the maximum amplitudes of the characteristic movements of the mirrors 3.2, 3.3 and/or the focus shift of optics 3.6. The three degrees of freedom of the tool movement, in the embodiment of FIG. 2 the movement of the laser beam 5 on the workpiece 4, are designated $F_7$ to $F_9$ in FIG. 2. On workpiece 4 said degrees of freedom $F_7$-$F_9$ in the chosen representation according to FIG. 2 correspond to Cartesian shifts in the X, Y and Z directions, as is shown in the lower part of FIG. 2 in a representation tilted compared with the remainder of FIG. 2. In particular, the Z direction corresponds to focussing degree of freedom $F_9$ of tool 3.

A coupling-in E of laser energy takes place in the vicinity of a coupling in unit 3.8, which can be located as an alternative to the construction shown in FIG. 2 outside the tool 3 in the vicinity of the fifth or sixth robot axis.

Figure 3:
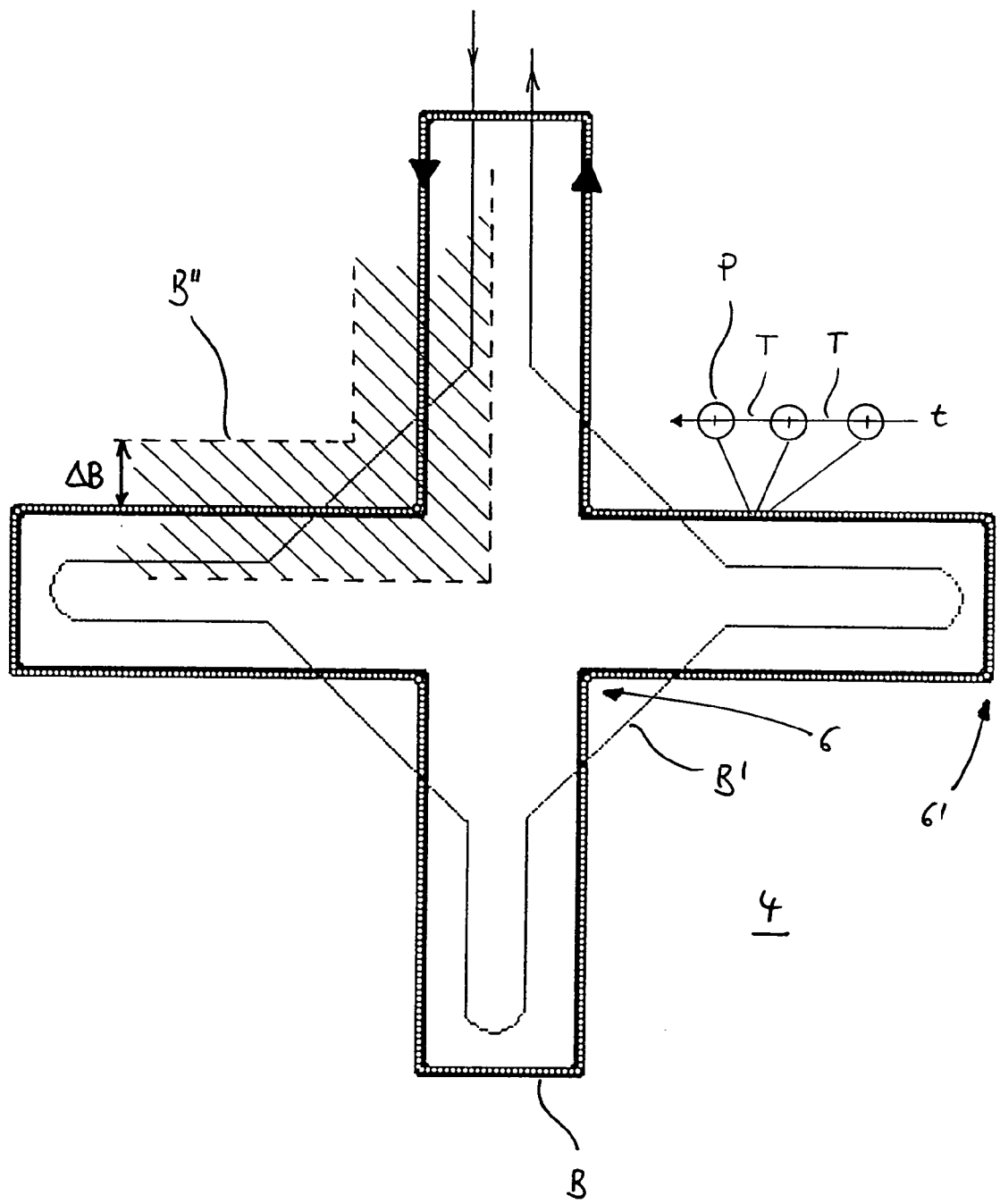
FIG. 3 A continuous machining geometry (machining path) for a workpiece with superimposed manipulator path movement.

FIG. 3 diagrammatically shows a simple, continuous machining geometry implementable with the device and method according to the invention, i.e. a movement path B of the tool tip (TCP) in the form of a cruciform contour, e.g. for the laser inscription of the surface of a workpiece 4. In FIG. 3 on the machining path B is superimposed a movement path B' of the robot 2 (FIG. 1) or the distal end 2.2 of the robot arm 2.1, to which can be fixed the tool 3. Particularly in areas 6, 6', where there is a significant change to the course of the machining path B, i.e. at the corners or edges of the machining path B, the movement path B' of the robot has a course B' clearly differing from the machining geometry B.

Throughout the machining the robot movement B' is within a space area B'' ("mobility tube", hatched in FIG. 3), which on all sides surrounds the movement path B and whose divergence ΔB from the machining path 3 in each case corresponds to a maximum movement amplitude of the tool 3 in its three degrees of freedom $F_7$-$F_9$ (cf. FIG. 2).

The points P along the machining path B, whereof some are shown on a larger scale in the upper part of FIG. 3, represent the interpolation cycle (IPO cycle) of the control unit 2.3 of the inventive device 1 (FIG. 1). In the embodiment of FIG. 3, the IPO cycle has a time slot pattern T of e.g. T=2 ms. The regular sequence of points P along the machining path B indicates that in accordance with the invention the workpiece 4 is machined with a constant machining speed. In known machining devices or methods the movement path B' of the manipulator 2 essentially corresponds to the predetermined machining path B. Particularly in areas 6, 6' where there is an abrupt direction change of the machining path B, this leads as a result of the necessary repositioning of the relatively inert axes of the manipulator 2 to machining only being possible at a reduced speed in these areas. Therefore the points P in a representation corresponding to FIG. 3 move closer together in these areas 6, 6'. This significantly increases the machining time t for a given workpiece 4.

According to the invention, this disadvantage is obviated in that as a result of the combined real time movement control of manipulator 2 and tool 3, the negative inertia effect of the robot axes is compensated in that they lead or trail in their movement B' in given areas 6, 6' with respect to a predetermined machining path B and possibly diverge therefrom, whilst the following of the machining path B in these areas 6, 6' is ensured by characteristic movements of the tool 3, which can regularly be performed at a higher speed. Thus, in difficult areas of the machining contour, the manipulator 2 reduces the length of its path movement B' and leaves the following of the machining path B' in these areas to the tool 3, so that the machining process as a whole is not negatively influenced by the inertia of the manipulator 2.

The machining path B is stored in the memory unit 2.4 of the control unit 2.3 of the inventive device 1 shown in FIG. 1 in the form of coordinate values spaced in time from one another by the value T. For determining the mobility tube B" use is made of the determination unit 2.5 also shown in FIG. 1. For the time and/or space optimized movement control of the manipulator 2 within the mobility tube B" are provided the processor means 2.7 shown in FIG. 1, which cooperate with the determination means 2.6 by means of which by the dynamic determination of a relative pose (location and orientation) between the tool tip of the inventive device and a sum of the coordinate values of the machining path B and the associated deviation ΔB, it is ensured that despite dynamic adaptation of the robot movement B' and/or the characteristic movements X, Y, Z of the tool 3, the machining path B is maintained at all times.

For this purpose, following the optimization of the movement path B', the control unit 2.3 (FIG. 1) supplies adapted control signals to the control unit 3.7 of tool 3. Thus, the characteristic movement X, Y, Z of the tool 3 can "supplement" the movement path B' of the machining path B.

Figure 4:
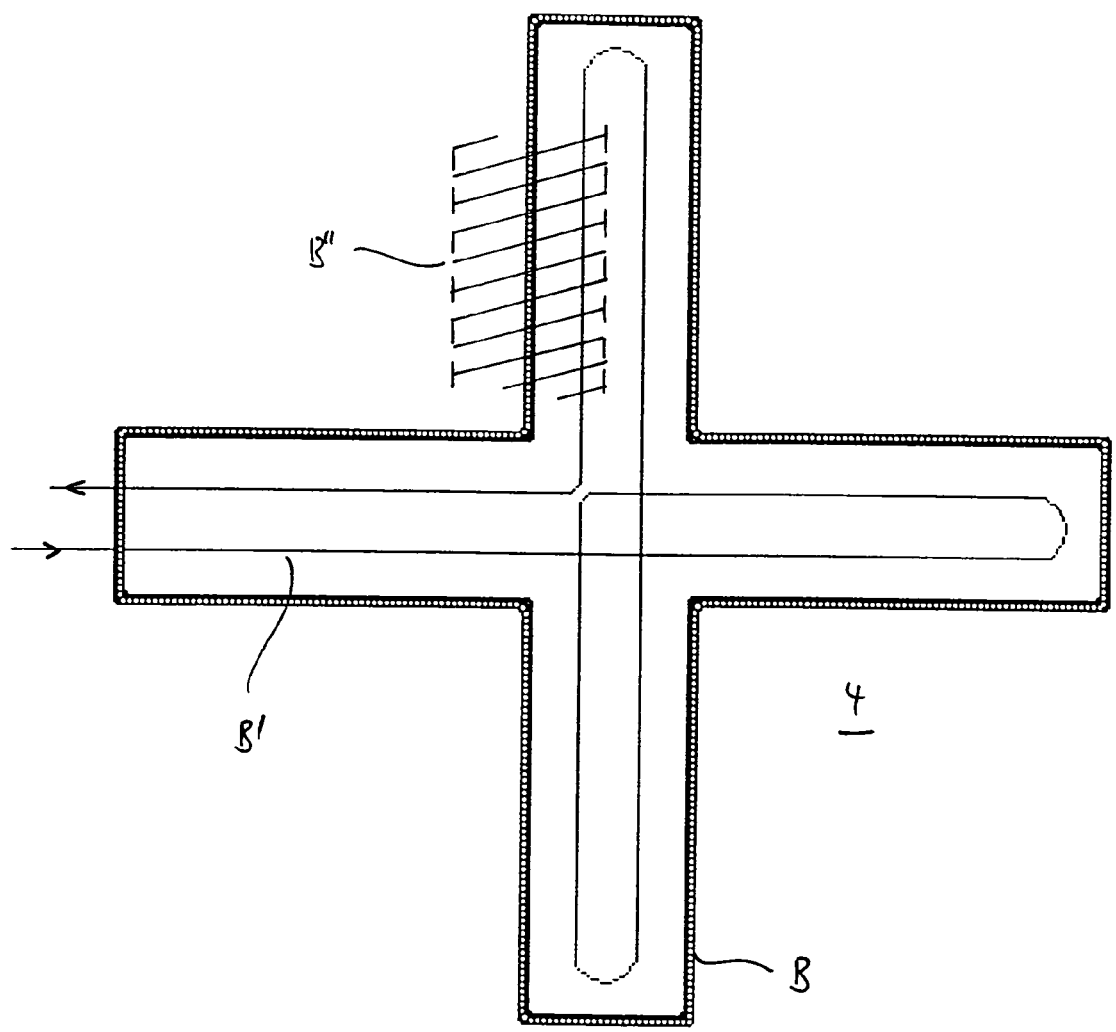
FIG. 4 The machining path according to FIG. 3 with a different superimposed manipulator path movement.

FIG. 4 shows another possible movement path B' of the manipulator 2 for following the predetermined, cruciform machining path B of FIG. 3. In the embodiment of FIG. 4 use is exclusively made of the area of the machining tube B" located within the contour of the machining path B. Such a movement guidance of the manipulator 2 is particularly advantageous if it is not possible to implement lengthier robot movements B' due to external obstacles or in some other way a particularly component-optimized movement path B' is necessary or sought.

Figure 5:
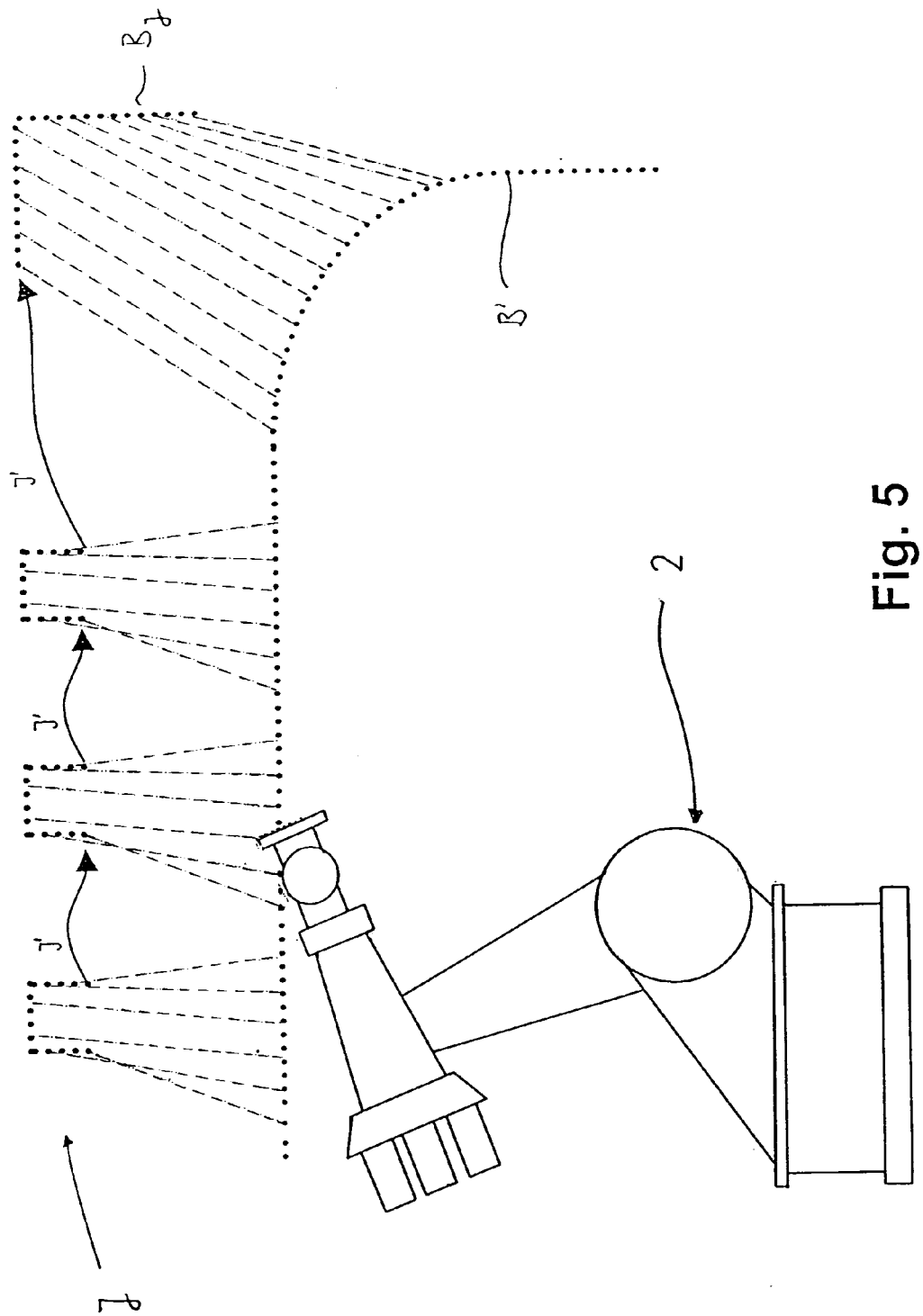
FIG. 5 A diagrammatic representation of a portionwise, continuous machining geometry (step function) with an associated manipulator path movement.

FIG. 5 diagrammatically shows the use of the method and device according to the invention when machining a workpiece when the tool tip no longer follows a simple, continuous path on the workpiece. The machining geometry J of FIG. 5 is a sequence of portionwise continuous geometry parts $B_J$, $B_{J'}$ within the framework of a so-called step function. Between the continuous parts $B_J$, the tool tip performs a step movement J', which takes place with a 100 to 1,000 times higher speed than the machining movement during that on the parts $B_J$, $B_{J'}$, so that no processing time is lost. In step functions, it is possible to jump random machining geometries (also in three dimensions) with a robot movement from the last worked path function (machining mode with simple, continuous path). As the jumps or steps only have a limited time duration (a few μs), it is possible to reduce the laser power during the steps solely through ramps instead of completely switching it off. As the steps take place at a higher speed than the machining movements (see above), no laser tracks can be seen on the workpieces. The geometries can differ between individual steps or jumps, so that it is also possible to produce inscriptions or graphics. Another example for the use of step functions is a sequence of isolated, i.e. spatially separated welding spots.

Figure 6:
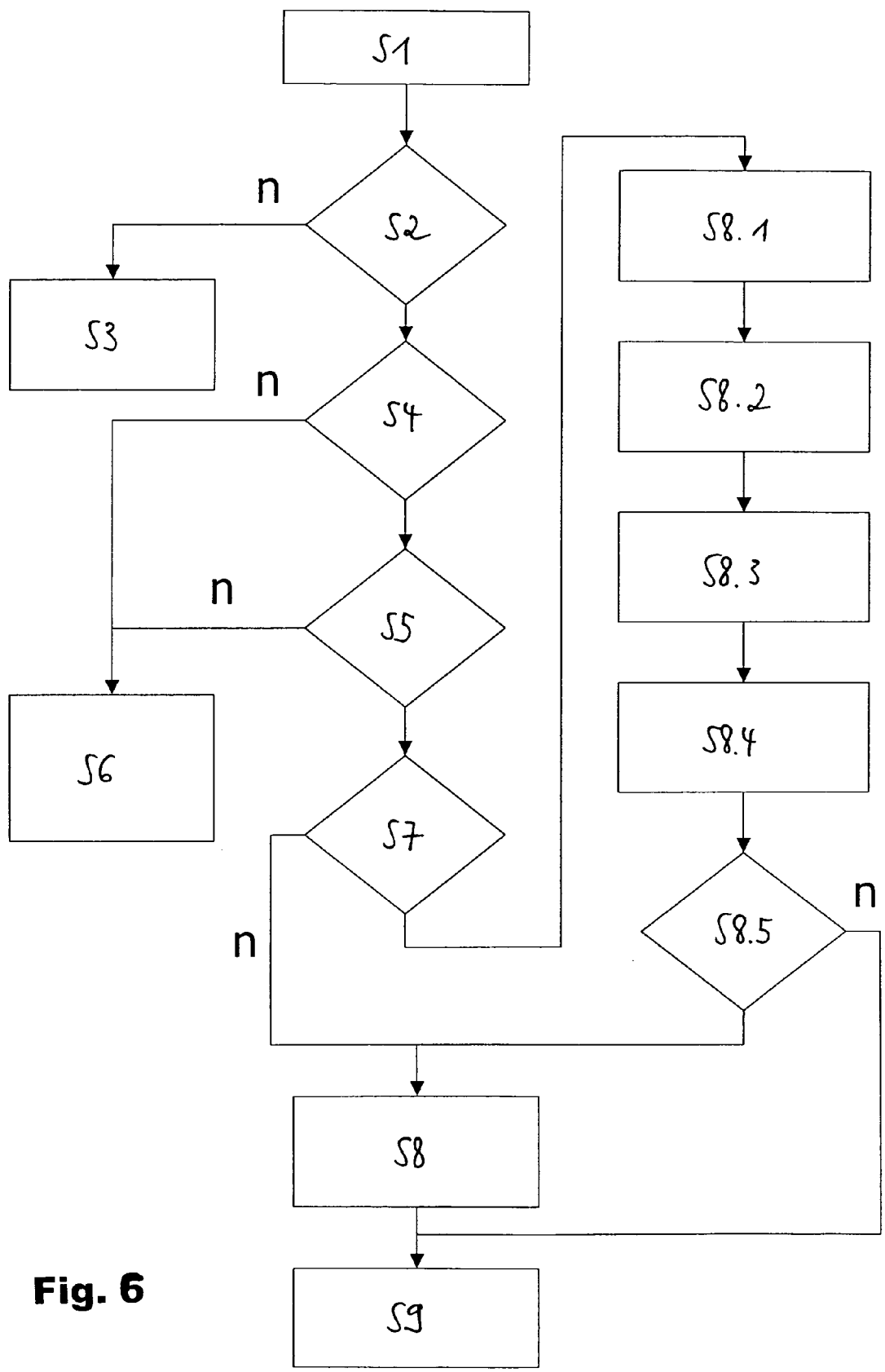
FIG. 6 A flow chart of the workpiece machining method according to the invention.

By means of a flow chart, FIG. 6 shows the sequence of an inventive machining method by means of an industrial robot 2 equipped with a laser machining tool 3. The control method illustrated in FIG. 6 inventively takes place in the control unit 2.3 of the manipulator 2 shown in FIG. 1. The starting point of the method in stage S1 is a determination of the robot type (number of axes), and optionally of the coordinate system used for movement control (e.g. Cartesian system). Subsequently in stage S2 an interrogation takes place as to whether the laser machining tool 3 used has three independent degrees of freedom of the movement, here specifically two mirror axes $F_7$, $F_8$ and a focal axis $F_9$. If the interrogation S2 is negated (n), there is a movement of the tool axes in accordance with the prior art, as desired, synchronously or asynchronously with respect to the robot movement S3. Otherwise in stage S4 an interrogation takes place as to whether a synchronous tool control (mirror-focus control) is to be taken over by the control unit 2.3 of robot 2. In this case in stage S5 the interrogation takes place as to whether a movement coordination is to take place between the robot and tool.

A synchronous tool control according to stage S4 is understood to mean a master path planning, which communicates to the robot and the mirrors in synchronous manner the positions to be approached. This e.g. takes place in the IPO cycle through an external computer in stage S6 (see below), which synchronously gives the cycle for both movement controls (robot and tool).

In the movement coordination according to stage Sf, the position system of the mirror control is placed on the three dimensional tool data system (TCP coordination) of the robot.

If one of the two interrogations S4, S5 is negated, then in stage S6 there is a coordination and a movement guidance of the axes through an external, not shown control unit.

If both interrogations S4, S5 are affirmed, then in stage S7 there is a further interrogation to establish whether the predetermined machining path B is identical with an action path, here a laser path. In the case of path functions, i.e. machining modes with continuous machining geometry, the machining path is generally outside the robot path in order to utilize the mirror speed advantages. However, a machining mode is also possible where the machining geometry is quasi on the robot path and machining only takes place of corners or a few radii of the contour in a "slide-over mode" of the TCP movement. The robot passes along a movement path, which e.g. "cuts off" the corners of the machining contour, much as shown in FIG. 3 at reference numeral 6, and the robot path can also be arcuate in space ("slide-over sphere"). The mirrors approach as the movement path the intended, taught reversal point, i.e. the corner or angle point. With regards to the machining contour, there can be a corner or angle in this point, which is located freely in the three dimensional space as a function of the previously and subsequently given points. If interrogation S7 is negated, it is possible in stage S8 and within the framework of so-called step functions to allow individual, defined deviations from a machining path (FIG. 5). In this case, directly following stage S9 there is a coordinated movement of the tool (scanner) 3 and manipulator 2.

If in stage S7 an identity between the machining paths B and laser path has been affirmed, stage S7, in place of the above-described stage S8, there are successively the following method stages S8.1 to S8.4: Firstly in stage S8.1 the machining path B (and the laser path) are broken up into discreet point or dot sequences of coordinate values on the basis of a time slot pattern proportional to the attainable IPO cycles of the manipulator 2 or its control unit 2.3. This specifically means that the coordinate values of positions in each case successively assumed in a time interval T (FIG. 3) are determined and filed in a memory unit 2.4 of the control unit 2.3, e.g. in the form of a data bank. Then in stage S8.2 for each IPO cycle a path difference between the predetermined machining path and a taught robot path is determined and its coordinate values can also be stored in the memory unit 2.4 of the control unit 2.3. The mobility tube B" described relative to FIG. 3 is calculated in stage S8.3 in determination unit 2.5 (FIG. 1) for the predetermined machining path B.

In stage S8.4 the path differences are then compared by determination means 2.6 with the maximum permitted deviation ΔB from the machining path B and then the taught path movement of the manipulator and as a function thereof the characteristic movements of the tool, i.e. the mirror positions and laser focus are optionally adapted in such a way that the movement path B' of the robot is located within the mobility tube B" defined in FIG. 3.

In stage S8.4 an automatic minimizing means ensures for the IPO points P (FIGS. 3 and 4), that in sections of the movement path B where there is no or only an insignificant change to the machining speed or a direction of the machining path B, working takes place with a minimum number of IPO points (coordinate values) and correspondingly longer IPO cycles. It is possible in this way to move the manipulator 2 faster with extrapolated coordinate values in these areas.

The operation of the automatic minimizing means is based on reducing the IPO points on the robot path. For example, only two support points are required for a linear movement of the TCP. In close curves with a high speed and e.g. a high necessary precision, a large number of path support points are required in the IPO cycle. If the path speed or path precision to be attained is reduced, possibly fewer path support points on the robot path are sufficient. The automatic minimizing means is a function of the desired system precision and chooses offline the maximum necessary path support points on the robot path. However, the mirrors are approached with a multiple of the IPO cycle.

Stage S8.4 is followed in stage S8.5 by an interrogation as to whether additional machining geometries are to be approached away from the actual machining path B. This is understood to mean that if a device according to the invention follows path functions, such as longer seams (also away from the robot path), the next machining mode can be a step function, followed by a longer seam (i.e. a path) etc. Door corners are e.g. welded as a seam, followed by five bracket-like edges replacing welding spots. In this way it is possible to mix path functions and different geometries, e.g. lines, circles, brackets, letters, ASCII symbols and the two and three-dimensional geometries which can be produced from them. If the interrogation is affirmed, the above-explained stages S8 and S9 are performed, otherwise directly at S8.4 or S8.5 commences the coordinated movement of tool 3 and robot 2 in stage S9.

The invention claimed is:

1. A for machining workpieces, the method comprising:
providing a multiaxial manipulator with a tool moved proportionally by a control unit of the manipulator, said manipulator including a control unit, said tool performing characteristic movements with several degrees of freedom, wherein the degrees of freedom of the tool are evaluated together with the degrees of freedom of axes of the manipulator in real time for moving a tool tip (TCP) in accordance with a predetermined machining geometry and for determining a movement of the manipulator;
providing coordinates of the machining geometry as input into said control unit of the manipulator for a movement control of the tool tip, wherein a movement path of the manipulator is dynamically determined by the control unit in that an instantaneous coordinate difference between the machining geometry and a position and orientation (pose) of the tool tip does not exceed the amplitude of the corresponding characteristic movements of the tool.

2. Method according to claim 1, wherein the tool tip (TCP) is at least temporarily moved along a single, continuous machining geometry (machining path).

3. Method according to claim 1, wherein the tool tip is moved at least temporarily along a portionwise continuous machining geometry (step function).

4. Method according to claim 1, wherein evaluation takes place through the control unit of the manipulator.

5. Method according to claim 1, wherein the machining geometry is discretized to a sequence of discrete coordinate values with an identical time interval (cycle time) between successive values.

6. Method according to claim 5, wherein the coordinate values of the machining geometry, prior to machining, are stored in a memory unit associated with the control unit.

7. Method according to claim 1, wherein with the coordinates of the machining geometry are associated correction values corresponding to maximum amplitudes of the characteristic movements of the tool in the degrees of freedom thereof.

8. Method according to claim 1, wherein the manipulator movement path is adapted to be as short as possible and/or so as to be component-correct.

9. Method according to claim 1, wherein the individual coordinates of the movement path of the manipulator and as a function thereof a pose of the tool are determined with respect to the cycles of the coordinate values of the machining geometry.

10. Method according to claim 1, wherein the movements of the manipulator and the tool are determined between the cycles by interpolation.

11. Method according to claim 5, wherein the cycle time is at least periodically adapted to at least one parameter of the movements.

12. Method according to claim 1, wherein the movement of the tool tip takes place with a substantially constant speed.

13. Method according to claim 1, wherein a predetermined movement path of the manipulator, prior to machining, is stored in the memory unit associated with the control unit.

14. Method according to claim 1, wherein, during machining, the workpiece is moved by the manipulator.

15. Method according to claim 1, wherein, during machining, the tool is moved by the manipulator.

16. A device for machining workpieces, the device comprising:
a multiaxial manipulator with a control unit for movement control purposes and a tool, which for performing characteristic movements has a plurality of degrees of freedom, wherein the tool and a tool tip (TCP) are movement-controllable by the manipulator control unit during the machining of a workpiece;
a memory unit associated with said control unit for storing at least one discretized sequence of coordinate values for a workpiece machining geometry;
a determination unit for determining deviations for the coordinate values of the machining geometry corresponding to amplitudes of the characteristic movements of the tool;
a determination means for the dynamic determination of a relative pose between the tool tip (TCP) and a sum of the coordinate values of the machining geometry and wherein the associated deviations and signals generated in the determination means can be transferred to the manipulator and the tool for coordinated movement control purposes.

17. Device according to claim 16, wherein, during machining, the workpiece is connected to and movable by the manipulator.

18. Device according to claim 16, wherein, during machining, the tool is connected to and movable by the manipulator.

19. Device according to claim 16, wherein there are processor means programmed and set up for time and/or space optimization of an instantaneous movement of the manipulator utilizing the degrees of freedom of the tool.

* * * * *

UNITED STATES PATENT AND TRADEMARK OFFICE
CERTIFICATE OF CORRECTION

PATENT NO. : 7,292,910 B2
APPLICATION NO. : 10/723695
DATED : November 6, 2007
INVENTOR(S) : Peter Gmeiner It is certified that error appears in the above-identified patent and that said Letters Patent is hereby corrected as shown below:

Col. 9, lines 45-64;
Please cancel claim 1 and replace it with the following claim:

--1. A method for machining workpieces, the method comprising:
providing a multiaxial manipulator with a tool moved proportionally by a control unit of the manipulator, said manipulator including a control unit, said tool performing characteristic movements with several degrees of freedom, wherein the degrees of freedom of the tool are evaluated together with the degrees of freedom of axes of the manipulator in real time for moving a tool tip (TCP) in accordance with a predetermined machining geometry and for determining a movement of the manipulator;
providing coordinates of the machining geometry as input into said control unit of the manipulator for a movement control of the tool tip, wherein a movement path of the manipulator is dynamically determined by the control unit in that an instantaneous coordinate difference between the machining geometry and a position and orientation (pose) of the tool tip does not exceed the amplitude of the corresponding characteristic movements of the tool.--

Signed and Sealed this

Nineteenth Day of August, 2008

JON W. DUDAS
*Director of the United States Patent and Trademark Office*